United States Patent
Alksnat et al.

[11] Patent Number: 6,087,737
[45] Date of Patent: Jul. 11, 2000

[54] BATTERY DISCONNECTION SYSTEM

[75] Inventors: Holger Alksnat, Gevelsberg; Stefan Kriegesmann, Dortmund, both of Germany

[73] Assignee: Delphi Technologies, Inc., Troy, Mich.

[21] Appl. No.: 09/211,146

[22] Filed: Dec. 14, 1998

[30] Foreign Application Priority Data

Jan. 13, 1998 [GB] United Kingdom ................... 9800589

[51] Int. Cl.[7] .................................................. H01H 71/46
[52] U.S. Cl. ...................... 307/10.7; 307/10.2; 307/125; 180/282; 320/136
[58] Field of Search ................................. 307/10.7, 10.1, 307/9.1, 10.2, 125; 180/282; 340/426, 428; 320/136; 361/78; 324/503

[56] References Cited

U.S. PATENT DOCUMENTS

| 4,798,968 | 1/1989 | Deem | 307/10.7 |
|---|---|---|---|
| 4,958,084 | 9/1990 | Carlo et al. | 307/10.2 |
| 5,581,231 | 12/1996 | Cardoso | 307/10.7 |
| 5,612,659 | 3/1997 | Kerber | 335/177 |
| 5,668,465 | 9/1997 | May | 320/136 |
| 5,854,555 | 12/1998 | Sasaki | 324/503 |
| 5,949,157 | 9/1999 | Hirzel | 307/125 |

FOREIGN PATENT DOCUMENTS

| 0350325 A2 | 1/1990 | European Pat. Off. |
|---|---|---|
| WO91/15889 | 10/1991 | WIPO . |
| WO94/16467 | 7/1994 | WIPO . |
| WO94/18039 | 8/1994 | WIPO . |

*Primary Examiner*—Albert W. Paladini
*Attorney, Agent, or Firm*—Patrick M. Griffin

[57] ABSTRACT

A battery disconnection system (10) comprising a first electrical conductor (12) electrically connectable to a terminal of a battery; a second electrical conductor (16) electrically connectable to an electrical load (18); a first electrical contact (22) attached to the first electrical conductor; a second electrical contact (24) attached to the second electrical conductor; electrical connecting means (22) reciprocally movable in an axial direction (A) between a first position in which the connecting means electrically connects the first and second contacts and a second position in which the first and second contacts are disconnected; electric drive means (26) for moving the connecting means from the first position to the second position on receipt of a predetermined signal. The predetermined signal may be generated by a crash sensor, anti-theft device, or other adverse condition sensor, or a manually operable switch.

15 Claims, 4 Drawing Sheets

BATTERY DISCONNECTION SYSTEM

TECHNICAL FIELD

The present invention relates to a battery disconnection system for use in the electrical system of a motor vehicle.

BACKGROUND OF THE INVENTION

Fuse arrangements for disconnecting a vehicle battery from electrical loads in a motor vehicle are well known. In general, such fuse arrangements comprise an electrical conductor having a portion which melts when excessive current passes through the portion of the conductor. Whilst this type of fuse arrangement works well in preventing excessive currents reaching an electrical load, it has limitations in that it only operates when an excessive current passes through the conductor. Also, once a fuse has blown, it is necessary to replace the fuse to reconnect the battery to the electrical loads.

SUMMARY OF THE INVENTION

It is an object of the present invention to provide a battery disconnection system which disconnects a vehicle battery from an electrical load on detection of an adverse condition or on manual actuation.

A battery disconnection system in accordance with the present invention comprises a first electrical conductor electrically connectable to a terminal of a battery; a second electrical conductor electrically connectable to an electrical load; a first electrical contact attached to the first electrical conductor; a second electrical contact attached to the second electrical conductor; electrical connecting means reciprocally movable in an axial direction between a first position in which the connecting means electrically connects the first and second contacts and a second position in which the first and second contacts are disconnected; electric drive means for moving the connecting means from the first position to the second position on receipt of a predetermined signal.

The present invention provides protection for electrical loads on detection of a sensed adverse condition, such an excessive high temperature, a vehicle crash, overload current, an anti-theft device, or other sensed adverse condition, any of which may provide the predetermined signal. Further, the predetermined signal may be provided by a manually operable switch.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
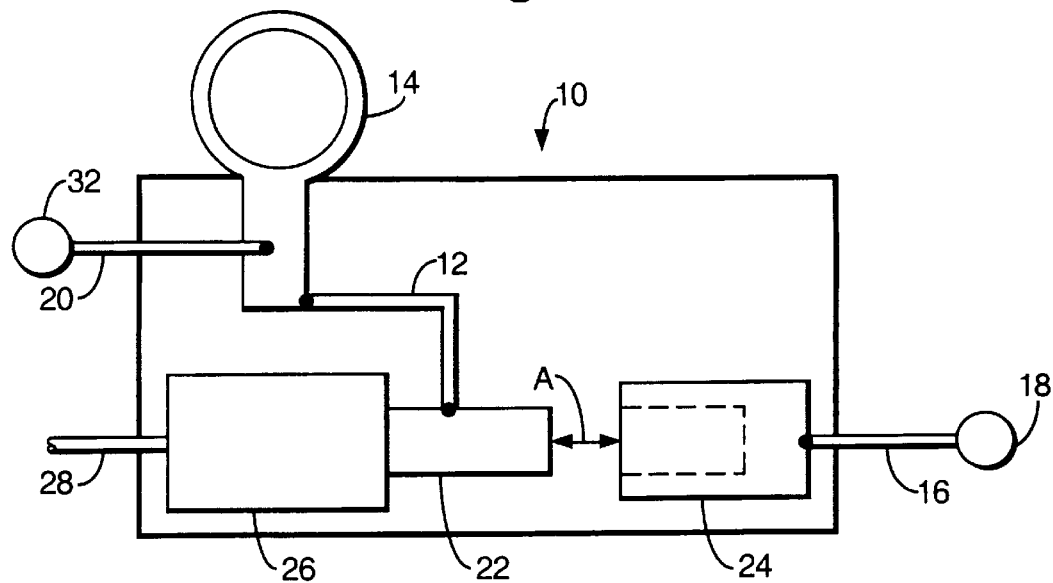
FIG. 1 is a schematic diagram of a first embodiment of battery disconnection system in accordance with the present invention.

Referring to FIG. 1, the battery disconnection system 10 comprises a first electrical conductor 12 which is connected to a battery terminal connector 14, and a second electrical conductor 16 which is connected to one or more electrical loads 18. The battery terminal connector 14 can be connected to a battery terminal (not shown) of a battery of a motor vehicle to directly mount the battery disconnection system 10 directly on the vehicle battery. An additional electrical conductor 20 is connected to the battery terminal connector 14 for supplying power to additional electrical loads 32 which normally need to be permanently connected to the vehicle battery. A first electric contact 22 is attached to the first conductor 12 and a second electric contact 24 is attached to the second conductor 16. In this first embodiment, the first contact 22 is a male contact and the second contact 24 is a corresponding female contact. The battery disconnection system 10 also comprises electric drive means 26. The male contact 22 (which defines electrical connecting means) is secured to the electric drive means 26. The electric drive means 26 can reciprocally move the male contact 22 in the axial direction of arrow A between a first position in which the male contact mates with the female contact 24, and a second position (as shown in FIG. 1) in which the male contact is disconnected from the female contact. The electric drive means 26 moves the male contact 22 in accordance with a predetermined signal on a line 28 connected to the electric drive means.

The signal on line 28 can be provided by any one of a number of devices such as a manually operable switch (for disconnecting the battery during transportation, storage, or servicing, of the motor vehicle); or a sensor detecting an adverse condition, such as a vehicle crash, overload current, excessively high temperature, vehicle theft, etc. The electric drive means 26 is preferably biased to place the male contact 22 in the first position, with the male contact being moved to the second position by the electric drive means when the predetermined signal is produced on line 28. The electric drive means 26 is preferably an electromagnetic device, such as a solenoid or a relay.

Figure 2:
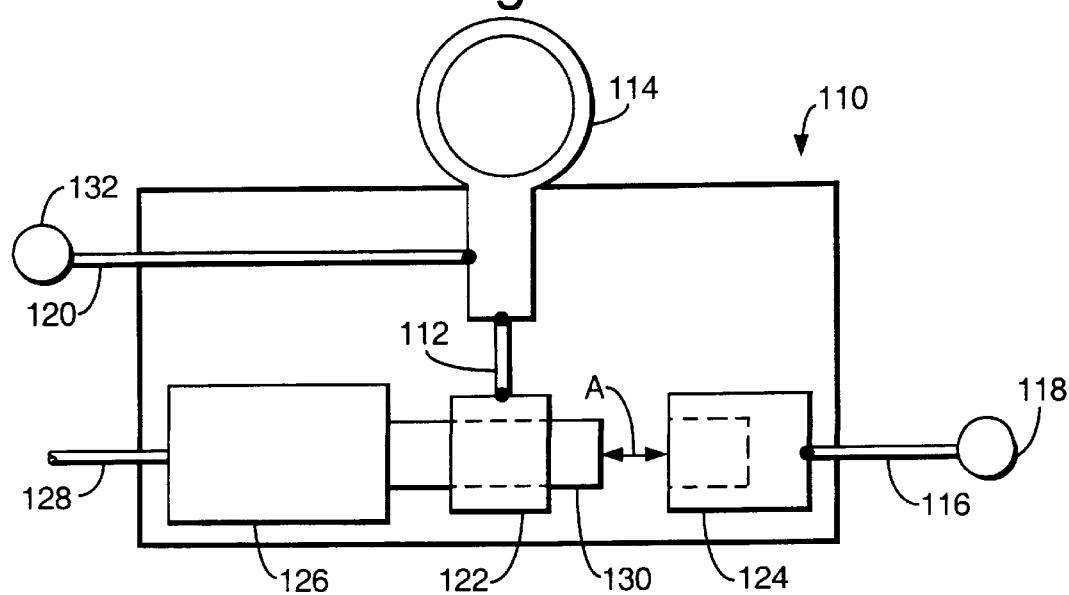
FIG. 2 is a schematic diagram of a second embodiment of battery disconnection system in accordance with the present invention.

In the second embodiment of battery disconnection system 110 shown in FIG. 2, like parts have been given the same reference as the first embodiment with the prefix 100. In this second embodiment of battery disconnection system 110 (when compared to the first embodiment), the first contact 122 is a female contact, and the electrical connecting means comprises a male contact 130 which is secured to, and movable by, the electric drive means 126. The male contact 130 mates with the first female contact 122 for all positions of the male contact. The male contact 130 also mates with the second female contact 124 in the first position of the male contact, but is disconnected from the second female contact in the second position of the male contact. The male contact 130 therefore provides a connecting bridge between the first and second female contacts 122,124 in the first position of the male contact. Operation of the second embodiment of battery disconnection system 110 is substantially the same as that described above for the first embodiment.

Figure 3:
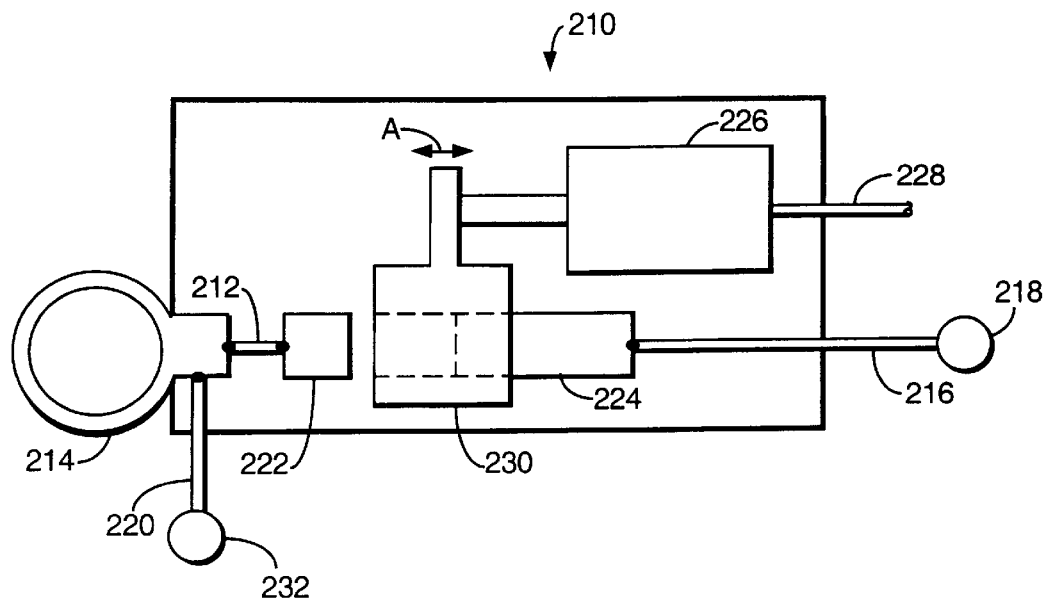
FIG. 3 is a schematic diagram of a third embodiment of battery disconnection system in accordance with the present invention.

In the third embodiment of battery disconnection system 210 shown in FIG. 3, like parts have been given the same reference as the first embodiment with the prefix 200. In this third embodiment of battery disconnection system 210 (when compared to the first embodiment), the second contact 224 is a male contact, and the electrical connecting means comprises a female contact 230 which is secured to, and movable by, the electric drive means 226. The female contact 230 mates with the second male contact 224 for all positions of the female contact. The female contact 230 also mates with the first male contact 222 in the first position of the female contact, but is disconnected from the first male contact in the second position of the female contact. The female contact 230 therefore provides a connecting bridge between the first and second male contacts 222,224 in the first position of the female contact. Operation of the third embodiment of battery disconnection system 210 is substantially the same as that described above for the first embodiment.

Figure 4:
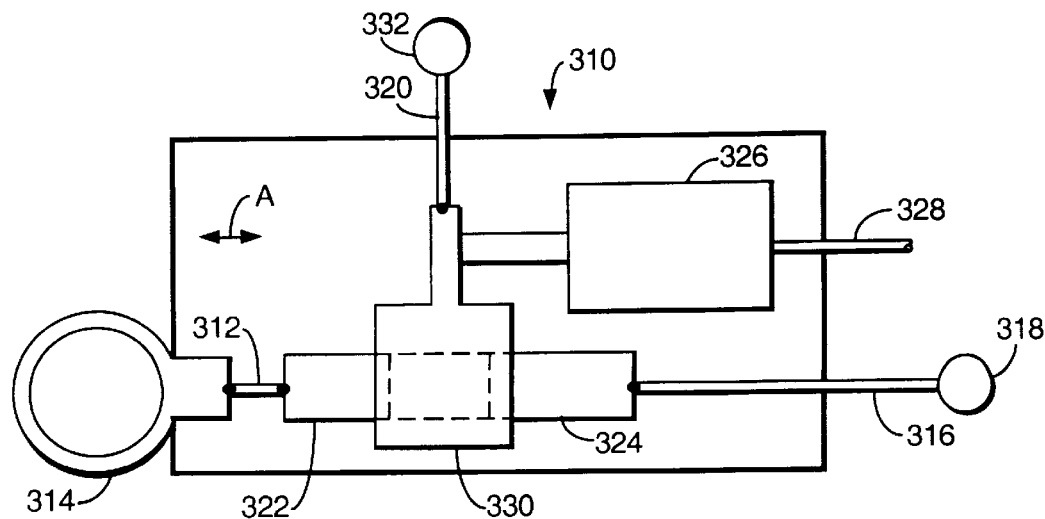
FIG. 4 is a schematic diagram of a fourth embodiment of battery disconnection system in accordance with the present invention in a first position of the female contact.
Figure 5:
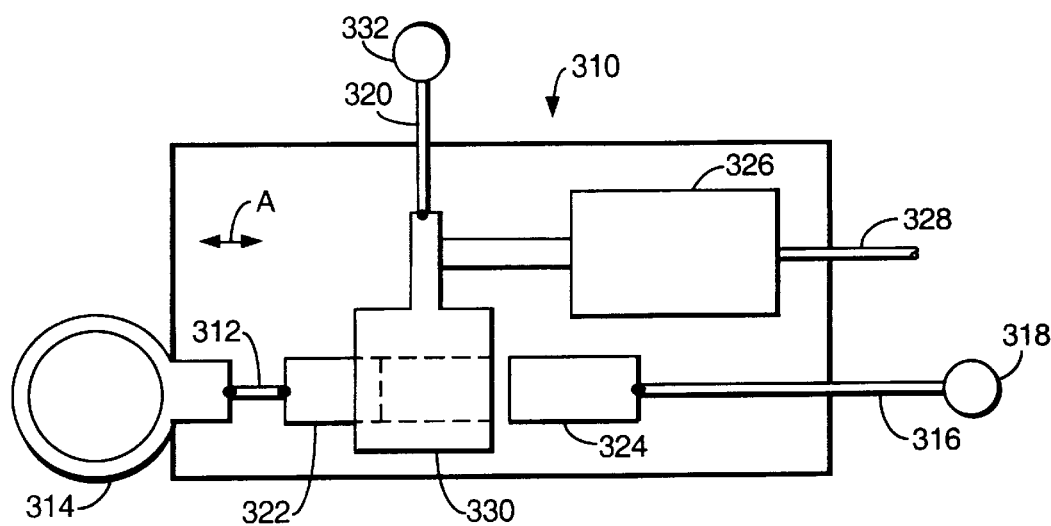
FIG. 5 is a similar view to that of FIG. 4 in a second position of the female contact.
Figure 6:
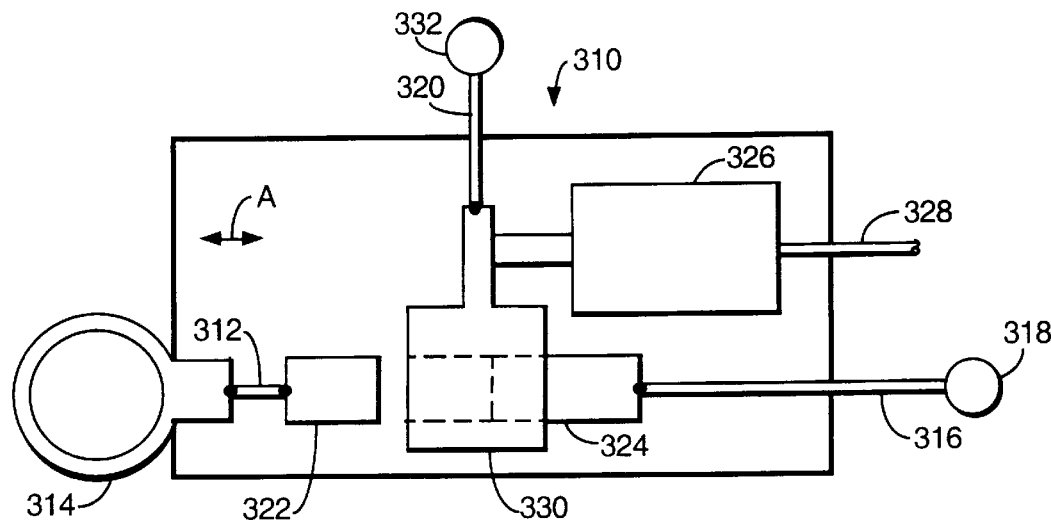
FIG. 6 is a similar view to that of FIG. 4 in a third position of the female contact.

The fourth embodiment of battery disconnection system 310 shown in FIGS. 4 to 6 is similar to the third embodiment shown in FIG. 3 and like parts have been given the same reference numeral with the prefix 300. In this fourth embodiment, the additional electrical conductor 320 is electrically connected to the female contact 330 rather than the battery terminal connector 314. The female contact 330 is secured to, and movable by, the electric drive means 326 from a first position (FIG. 4) to a second position (FIG. 5), and from the first position to a third position (FIG. 6). In the first position, the female contact mates with the first male contact 322 and with the second male contact 324 to provide electrical power to the electrical loads 318 connected to the second conductor 316, and to the additional electrical loads 332 connected to the additional electrical conductor 320 which normally need to be permanently connected to the vehicle battery. If a sensor (not shown) detects an adverse condition or a manual switch (not shown) is operated, the electric drive means 326 receives a signal on line 328 and moves the female contact 330 to the second position shown in FIG. 5. In the second position, the electrical loads 318 are disconnected from the vehicle battery, but the electrical loads 332 remain connected to the vehicle battery. If there is a need to totally disconnect all of the electrical loads 318,332 from the vehicle battery (for example, during transportation of the vehicle), a signal can be sent (for example, by manual operation) on line 328 to actuate the electric drive means 326 to move the female contact 330 to the third position shown in FIG. 6. Alternatively, the female contact 330 may be moved from the first position to the third position by manual operation.

Figure 7:
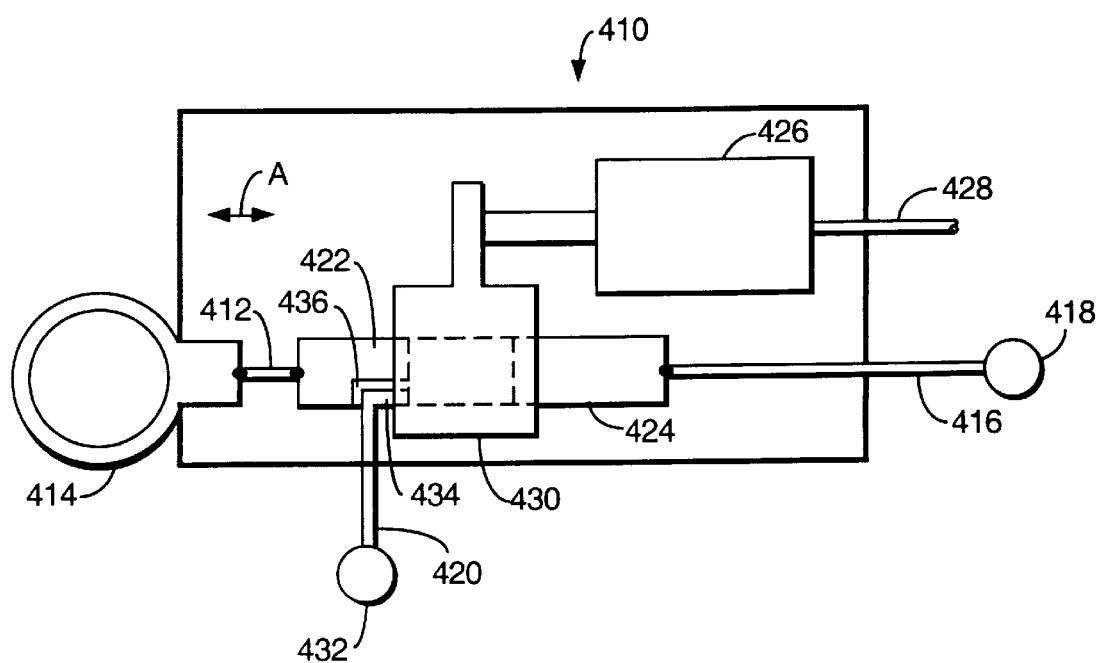
FIG. 7 is a schematic diagram of a fifth embodiment of battery disconnection system in accordance with the present invention.

The fifth embodiment of battery disconnection system 410 shown in FIG. 7 is similar to the fourth embodiment shown in FIGS. 4 to 6, and like parts have been given the same reference numeral with the prefix 400. In this fifth embodiment, the additional electrical conductor 420 has a male contact portion 434 which lies alongside the first male contact 422, and which is separated therefrom by a layer 436 of electrically insulating material. The movable female contact 430 can be moved between a first position (as shown in FIG. 7) in which the male contacts 422, 424 and 434 are electrically connected together by the female contact; a second position (similar to FIG. 5) in which the male contacts 422 and 434 are electrically connected by the female contact 430, but the male contact 424 is electrically disconnected; and a third position (similar to FIG. 6) in which the male contacts 424 and 434 are electrically disconnected from the male contact 422. Movement of the female contact 430 by the electric drive means 426 or by manual operation is as described above for the fourth embodiment.

The present invention can be used to disconnect power to the electrical loads on detection of an adverse condition, or on manual operation of a switch.

Although the above described embodiments show examples of the present invention being mounted directly on a terminal of a battery, it will be appreciated that the present invention could be located at any suitable position in the electrical connection between the battery and an electrical load.

What is claimed is:

1. A battery disconnection system comprising a first electrical conductor electrically connectable to a terminal of a battery; a second electrical conductor electrically connectable to an electrical load; a first electrical contact attached to the first electrical conductor; a second electrical contact attached to the second electrical conductor; electrical connecting means reciprocally movable in an axial direction between a first position in which the connecting means electrically connects the first and second contacts and a second position in which the first and second contacts are disconnected; electric drive means for moving the connecting means from the first position to the second position on receipt of a predetermined signal.

2. A battery disconnection system as claimed in claim 1, wherein the electrical connecting means is the first electrical contact.

3. A battery disconnection system as claimed in claim 2, wherein the first contact is a male contact and the second contact is a female contact.

4. A battery disconnection system as claimed in claim 1, wherein the first and second contacts are female contacts and the electrical connecting means is a male contact mateable with the female contacts.

5. A battery disconnection system as claimed in claim 1, wherein the first and second contacts are male contacts and the electrical connecting means is a female contact mateable with the male contacts.

6. A battery disconnection system as claimed in claim 5, wherein the electric drive means is a solenoid.

7. A battery disconnection system as claimed in claim 6, wherein the predetermined signal is generated by a crash sensor.

8. A battery disconnection system as claimed in claim 6, wherein the predetermined signal is generated by an overload detector.

9. A battery disconnection system as claimed in claim 6, wherein the predetermined signal is generated by an anti-theft device.

10. A battery disconnection system as claimed in claim 6, wherein the predetermined signal is generated by a manually operated switch.

11. A battery disconnection system comprising:
a first electrical conductor electrically connectable to a terminal of a battery;
a second electrical conductor electrically connectable to an electrical load;
a first electrical contact attached to the first electrical conductor;
a second electrical contact attached to the second electrical conductor;
electrical connecting means reciprocally movable in an axial direction between a first position in which the connecting means electrically connects the first and second contacts and a second position in which the first and second contacts are disconnected;
electric drive means for moving the connecting means from the first position to the second position on receipt of a predetermined signal, an additional electrical conductor electrically connected to the electrical connecting means and electrically connectable to additional electrical loads;

the electrical connecting means being reciprocally movable in the axial direction between first position and a third position;

the electrical connecting means being electrically connected to the first electrical contact in the second position, and the electrical connecting means being electrically disconnected from the first electrical contact in the third position.

12. A battery disconnection system comprising:

a first electrical conductor electrically connectable to a terminal of a battery;

a second electrical conductor electrically connectable to an electrical load;

a first electrical contact attached to the first electrical conductor;

a second electrical contact attached to the second electrical conductor;

electrical connecting means reciprocally movable in an axial direction between a first position in which the connecting means electrically connects the first and second contacts and a second position in which the first and second contacts are disconnected;

electric drive means for moving the connecting means from the first position to the second position on receipt of a predetermined signal, an additional electrical conductor electrically connectable to additional electrical loads, and an additional electrical contact attached to the additional electrical conductor, the additional conduct being positioned adjacent the first contact and spaced therefrom by electrically insulating material;

the electrical connecting means being reciprocally movable in the axial direction between the first position and a third position;

the electrical connecting means being electrically connected to the first, second and additional electrical contacts in the first position, the electrical connecting means being electrically connected to the first and additional electrical contacts in the second position, and the electrical connecting means being electrically disconnected from the first electrical contact in the third position.

13. A battery disconnection system as claimed in claim 12, wherein the electric drive means moves the electrical connecting means from the first position to the third position on receipt of another predetermined signal.

14. A battery disconnection system as claimed in claim 13, wherein the additional predetermined signal is generated by a manually operated switch.

15. A battery disconnection system as claimed in any one of claims 1 to 14, further comprising a battery terminal connector, the battery terminal connector being connected to the first electrical conductor.

* * * * *